US 11,494,148 B1

(12) United States Patent
Lindberg et al.

(10) Patent No.: US 11,494,148 B1
(45) Date of Patent: Nov. 8, 2022

(54) PORTABLE DISPLAY ASSEMBLY

(71) Applicants: Layne A. Lindberg, Rapid City, SD (US); Barbara Lindberg, Rapid City, SD (US)

(72) Inventors: Layne A. Lindberg, Rapid City, SD (US); Barbara Lindberg, Rapid City, SD (US)

(*) Notice: Subject to any disclaimer, the term of this patent is extended or adjusted under 35 U.S.C. 154(b) by 0 days.

(21) Appl. No.: 17/313,488

(22) Filed: May 6, 2021

(51) Int. Cl.
*G06F 3/14* (2006.01)
*G09G 5/22* (2006.01)
*H04N 5/225* (2006.01)
*G09F 9/30* (2006.01)
*G09F 21/04* (2006.01)

(52) U.S. Cl.
CPC ............... *G06F 3/14* (2013.01); *G09F 9/30* (2013.01); *G09G 5/22* (2013.01); *H04N 5/2257* (2013.01); *G09F 21/0485* (2021.05); *G09G 2330/02* (2013.01); *G09G 2360/14* (2013.01); *G09G 2370/16* (2013.01); *G09G 2380/06* (2013.01)

(58) Field of Classification Search
CPC .......... G06F 3/13; G06F 9/30; G06F 21/0485; G09G 5/22; G09G 2330/02; G09G 2360/14; G09G 2370/16; G09G 2380/06; H04N 5/2257
See application file for complete search history.

(56) References Cited

U.S. PATENT DOCUMENTS

| 6,177,877 | B1* | 1/2001 | Munyon | G06F 1/1622 340/815.45 |
| 8,646,194 | B2 | 2/2014 | Podd | |
| 2011/0199389 | A1 | 8/2011 | Lu | |
| 2013/0099698 | A1* | 4/2013 | Podd | H05B 47/105 315/297 |
| 2014/0111323 | A1 | 4/2014 | Strout | |
| 2014/0267014 | A1* | 9/2014 | Williams | B60Q 1/50 345/156 |
| 2016/0037625 | A1 | 2/2016 | Huitema | |
| 2016/0048369 | A1 | 2/2016 | Zenoff | |

FOREIGN PATENT DOCUMENTS

WO    WO2016014966    1/2016

* cited by examiner

*Primary Examiner* — Brent D Castiaux

(57) ABSTRACT

A portable display assembly includes a housing that is elongated. A display is coupled to the housing and the display extends along a substantial length of the housing. The display displays indicia comprising customizable images and words to visually communicate a message to an observer. An adhesive strip is coupled to the housing to engage a surface to retain the housing on the surface. A sign is included that has a handle portion and a panel portion, and the handle portion can be gripped by a user for displaying the panel portion. Moreover, the housing is attachable to the panel portion of the sign such that the display can visually communicate the message to the observer.

5 Claims, 9 Drawing Sheets

PORTABLE DISPLAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to display devices and more particularly pertains to a new display device for displaying a customizable message or images. The device includes a housing that can be mounted to a window and a display that is attached to the housing such that the display is visible through the window. Additionally, a sign is provided and the housing can be attached to the sign such that the housing can be displayed in a portable manner.

(2) Description of Related Art Including Information Disclosed Under 37 CFR 1.97 and 1.98

The prior art relates to display devices including a variety of electronic display devices that can display customizable imagery. Additionally, the prior art discloses a display that can be mounted to a window of a vehicle. The prior art also discloses a display device that includes displays that are integrated into body panels of a vehicle.

BRIEF SUMMARY OF THE INVENTION

An embodiment of the disclosure meets the needs presented above by generally comprising a housing that is elongated. A display is coupled to the housing and the display extends along a substantial length of the housing. The display displays indicia comprising customizable images and words to visually communicate a message to an observer. An adhesive strip is coupled to the housing to engage a surface to retain the housing on the surface. A sign is included that has a handle portion and a panel portion, and the handle portion can be gripped by a user for displaying the panel portion. Moreover, the housing is attachable to the panel portion of the sign such that the display can visually communicate the message to the observer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
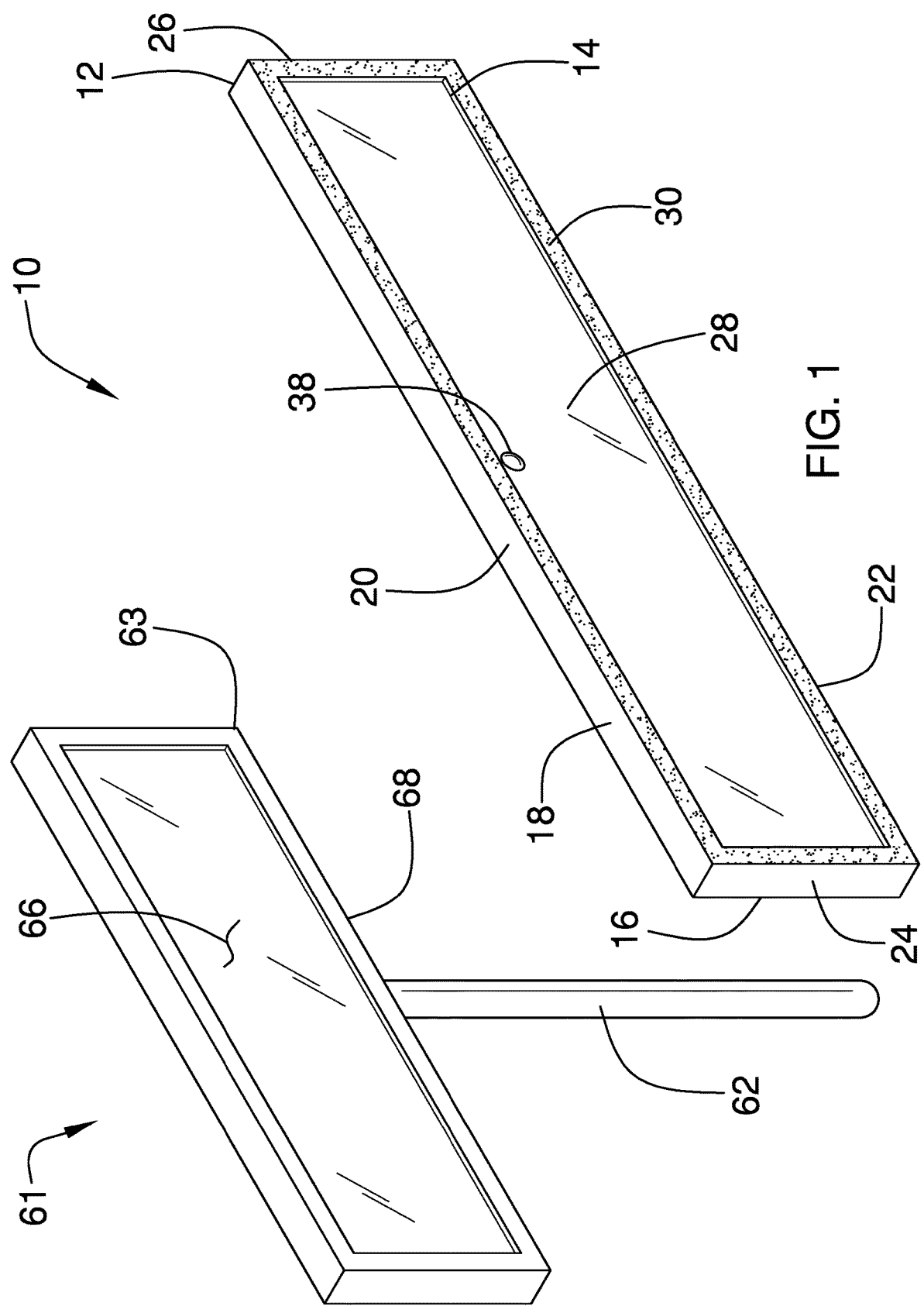
FIG. 1 is a front perspective view of a portable display assembly according to an embodiment of the disclosure.
Figure 2:
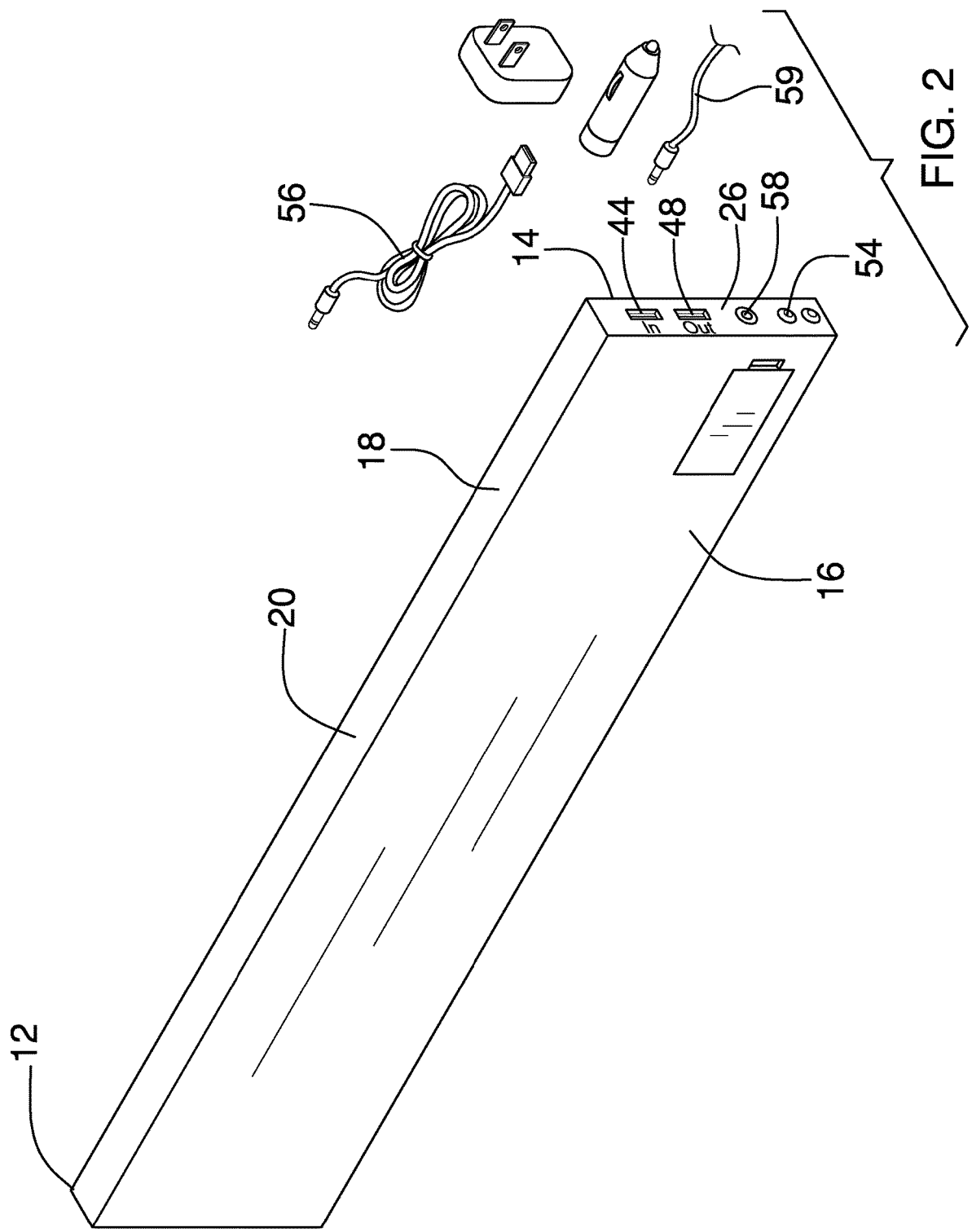
FIG. 2 is a back perspective view of an embodiment of the disclosure.
Figure 3:
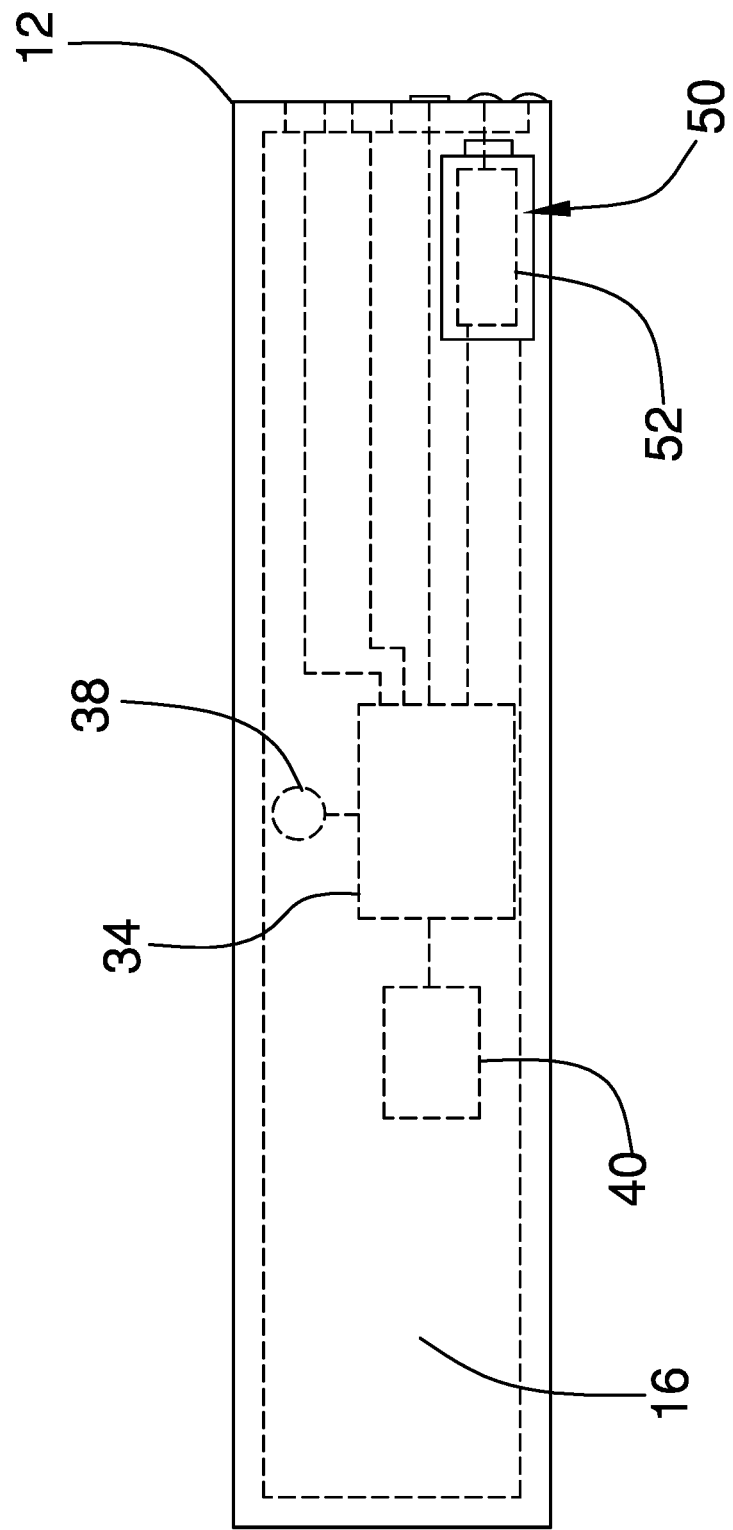
FIG. 3 is a back phantom view of an embodiment of the disclosure.
Figure 4:
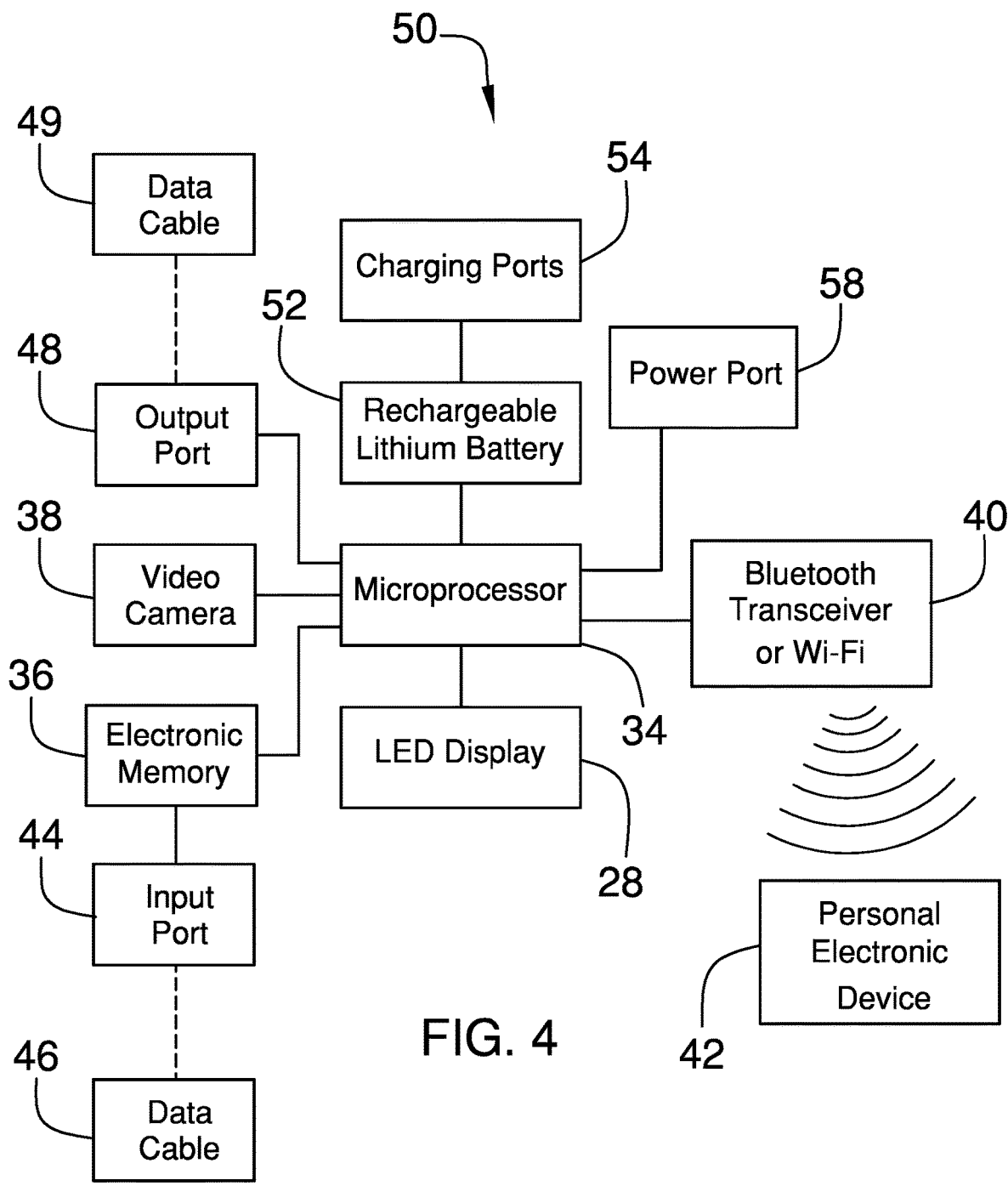
FIG. 4 is a schematic view of an embodiment of the disclosure.
Figure 5:
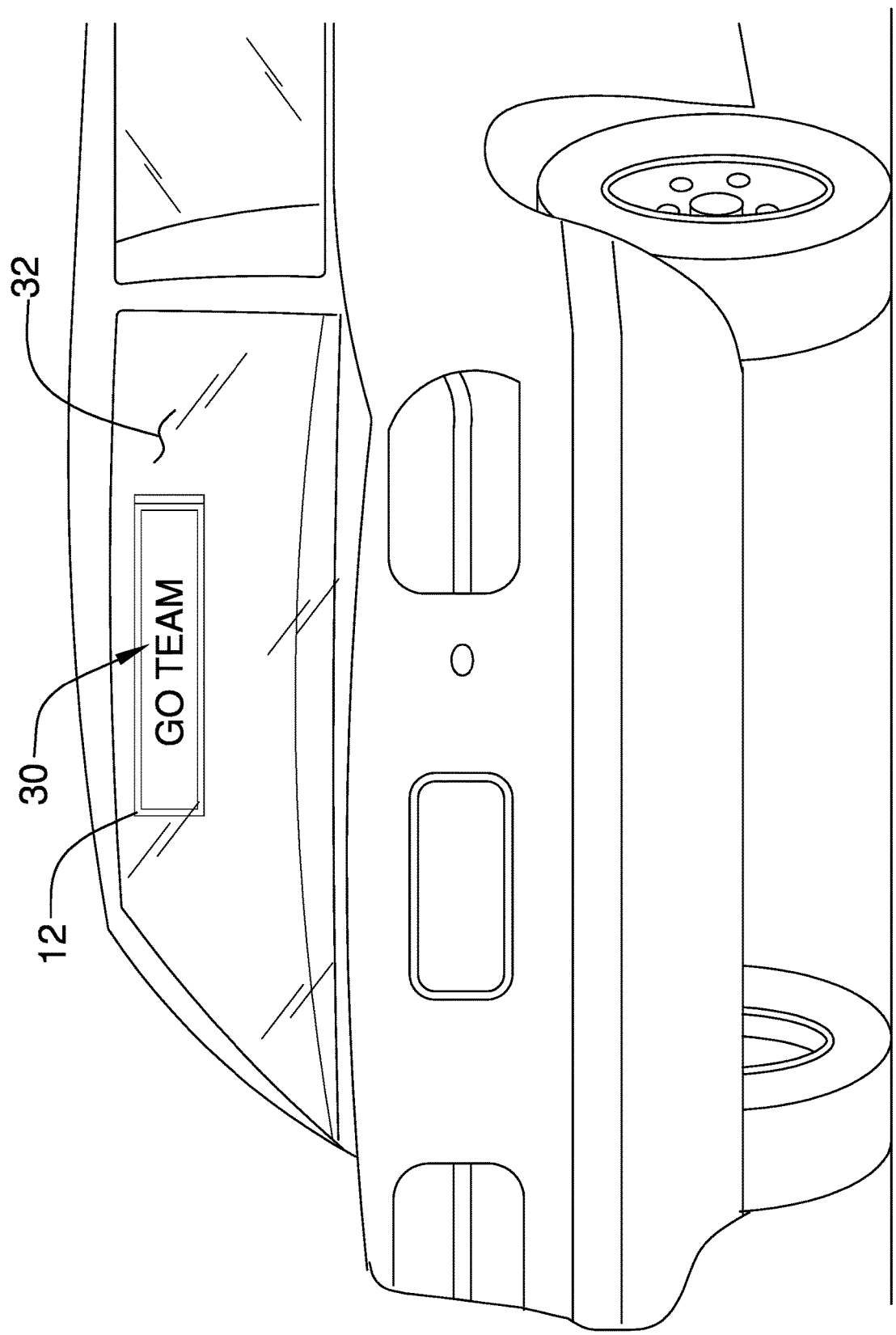
FIG. 5 is a perspective in-use view of an embodiment of the disclosure showing a display being mounted to a window of a vehicle.
Figure 6:
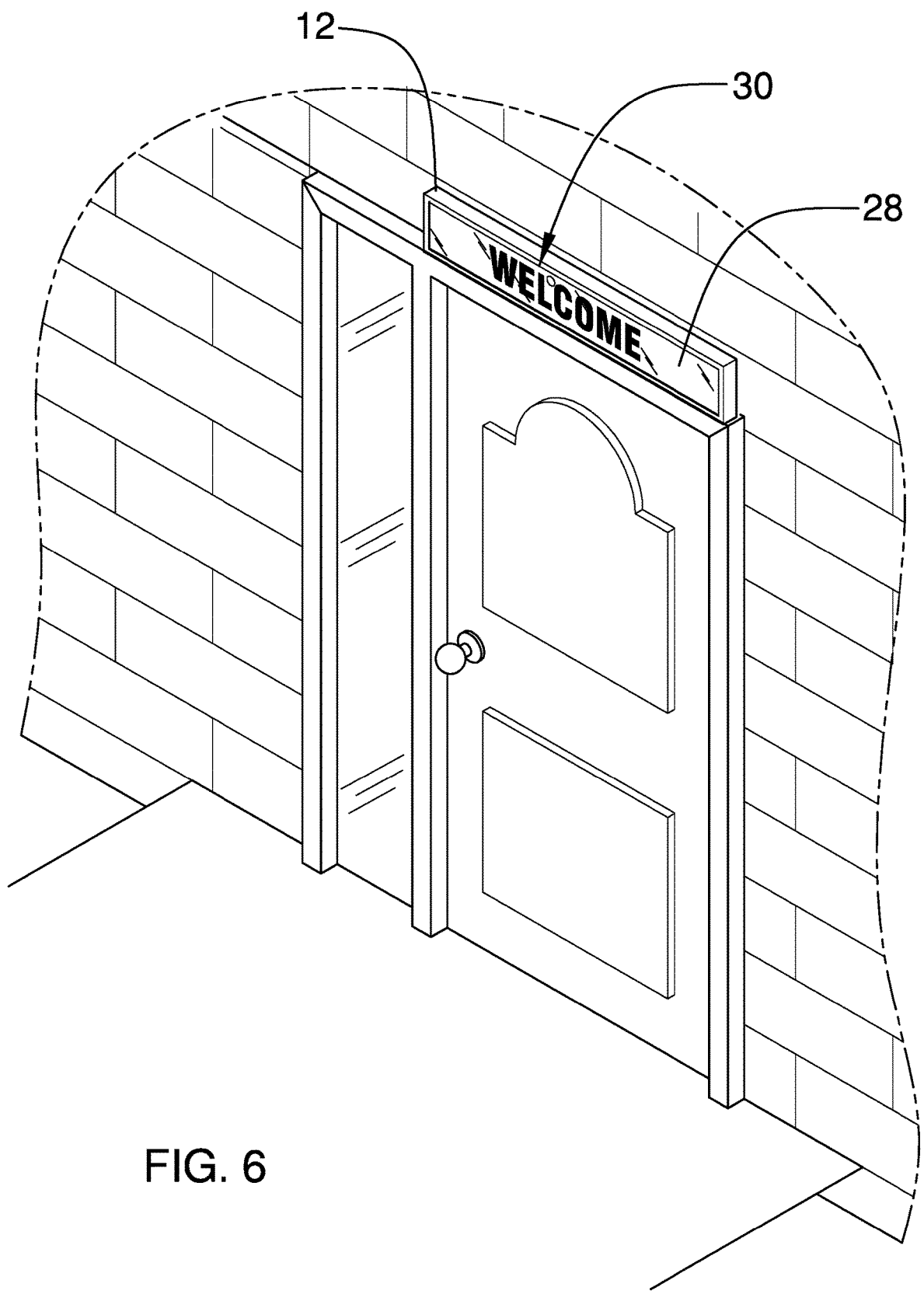
FIG. 6 is a perspective in-use view of an embodiment of the disclosure showing a display being mounted on a wall of a building.
Figure 7:
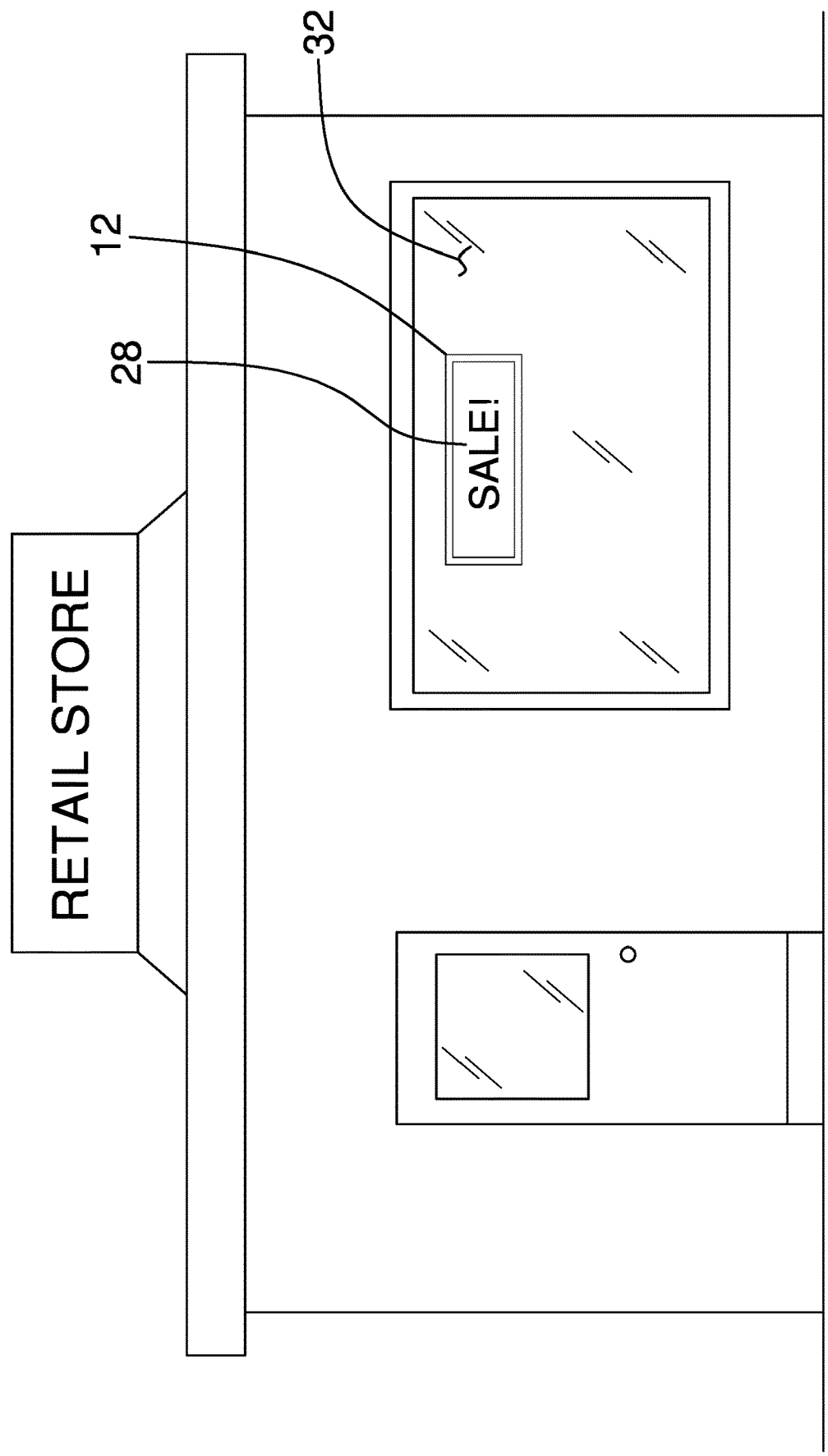
FIG. 7 is a perspective in-use view of an embodiment of the disclosure showing a display being mounted in a window of a storefront.
Figure 8:
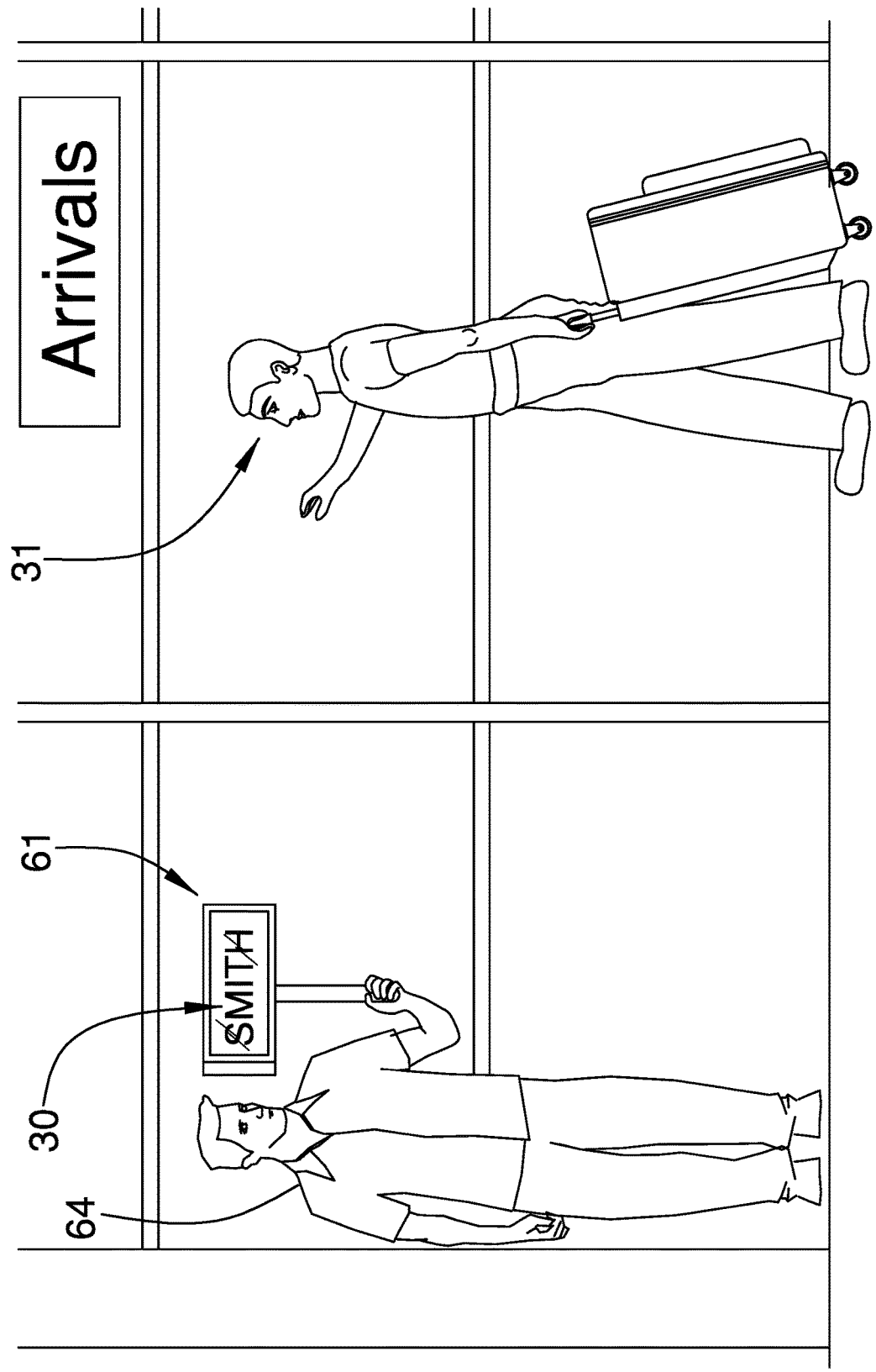
FIG. 8 is a perspective in-use view of an embodiment of the disclosure showing a display being mounted to a sign.
Figure 9:
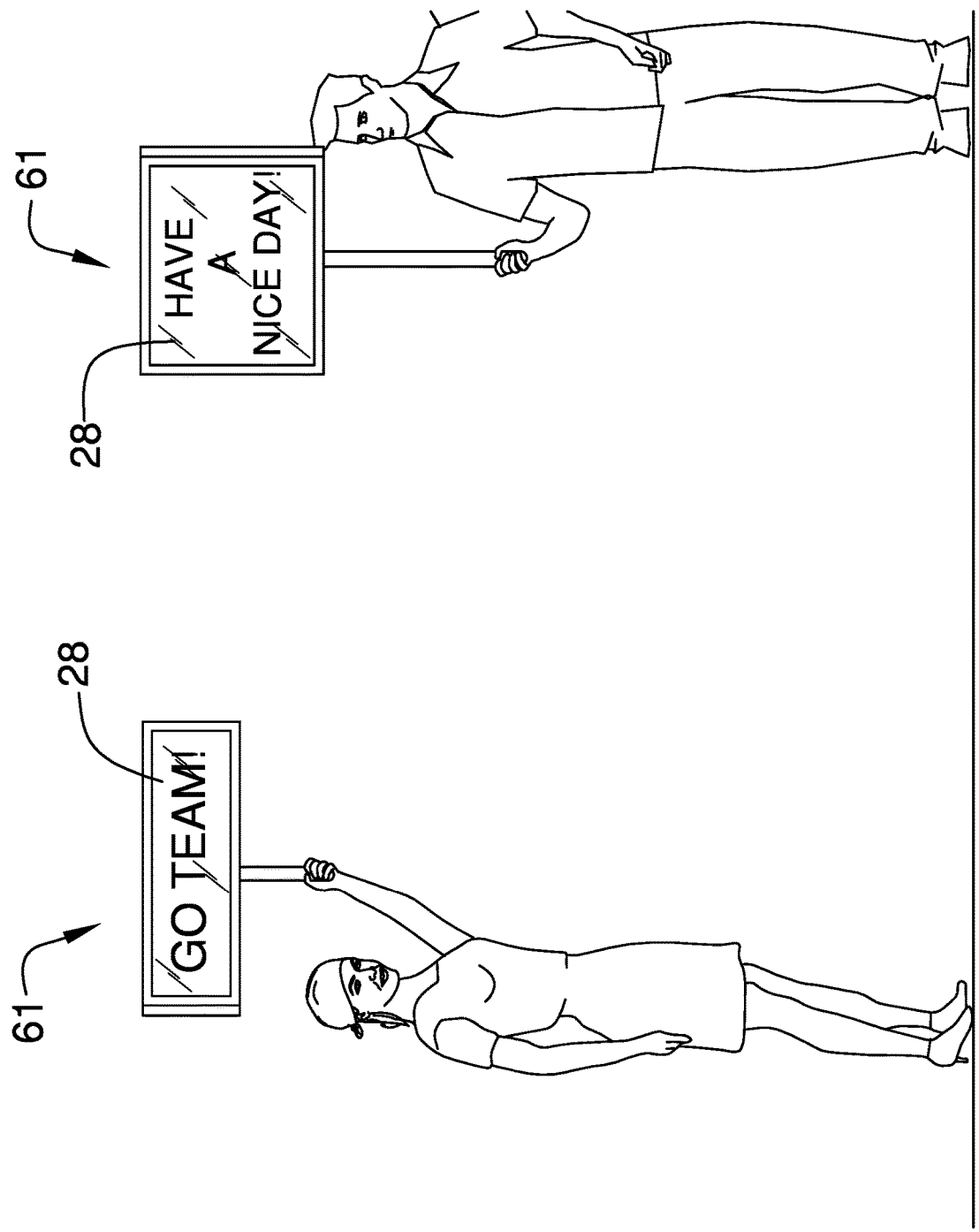
FIG. 9 is a perspective in-use view of an embodiment of the disclosure showing a housing being mounted to a sign at an outdoor event.

With reference now to the drawings, and in particular to FIGS. 1 through 9 thereof, a new display device embodying the principles and concepts of an embodiment of the disclosure and generally designated by the reference numeral 10 will be described.

As best illustrated in FIGS. 1 through 9, the portable display assembly 10 generally comprises a housing 12 that is elongated. The housing 12 has a front wall 14, a back wall 16 and an outer wall 18 extending between the front wall 14 and the back wall 16. The outer wall 18 has a top side 20, a bottom side 22, a first lateral side 24 and a second lateral side 26, and the housing 12 is elongated between the first lateral side 24 and the second lateral side 26. A display 28 is coupled to the housing 12 and the display 28 displays indicia 30 comprising customizable images and words to visually communicate a message to an observer 31.

The display 28 is positioned on the front wall 14 of the housing 12, and the display 28 is elongated to extend between the first lateral side 24 and the second lateral side 26 of the outer wall 18. The display 28 receives a downloaded signal comprising the customized images and words to be displayed on the display 28. In this way the display 28 can visually communicate a variety of messages to the observer. The display 28 may comprise a liquid crystal display or other type of electronic display that is capable of displaying an extensive variety of colors.

An adhesive strip 30 is coupled to the housing 12 to engage a support surface 32 and retain the housing 12 on the support surface 32. The support surface 32 might be a rear window of a vehicle, a store front window or any other transparent surface that is in a highly visible location. The adhesive strip 30 extends around the display 28 such that the adhesive strip 30 does not obstruct the display 28. The adhesive strip 30 can be positioned on either the front wall 14 of the housing 12 or the back wall 16 of the housing 12. In this way the front wall 14 could be mounted to an inside of a vehicle windshield, for example, or the back wall 16 could be mounted to an outside display. Additionally, the adhesive strip 30 might extend along each of the top side 20, the bottom side 22, the first lateral side 24 and the second lateral side 26 of the outer wall 18 of the housing 12. The adhesive strip 30 may comprise a multiple use, non residual adhesive that can be washed to renew the adhesive properties of the adhesive strip 30.

A control circuit 34 is positioned in the housing 12, the control circuit 34 is electrically coupled to the display 28 and the control circuit 34 includes an electronic memory 36. A video camera 38 is integrated into the housing 12 to capture imagery of the area in which the housing 12 is positioned. The video camera 38 is electrically coupled to the control circuit 34, the video camera 38 is positioned on the front wall 14 of the housing 12 and the video camera 38 is integrated into the display 28. The video camera 38 may comprise a digital video camera or other type of electronic video camera.

A transceiver 40 is positioned in the housing 12 and the transceiver 40 is electrically coupled to the control circuit 34. The transceiver 40 is in wireless communication with a personal electronic device 42, and the transceiver 40 receives the downloaded signal from the personal electronic device 42. In this way the customized images and words can be stored in the electronic memory 36 for subsequently being displayed on the display 28. The personal electronic device 42 may be a smart phone or other similar type of device. The transceiver 40 may comprise a radio frequency transceiver or the like and the transceiver 40 may employ Bluetooth communication protocols. Additionally, the transceiver 40 may employ a WPAN signal thereby facilitating the transceiver 40 to wirelessly connect to an internet router.

The personal electronic device 42 stores operational software to control the video camera 38 and the display 28, and the operational software might be called ReadMe2. The operational software may have image and word creation functions to facilitate the words and images to be customized. In this way the personal electronic device 42 can upload the customized images and words to the transceiver 40 for displaying on the display. Additionally, the operational software might be in communication with a theft alarm of a vehicle in which the housing 12 is positioned. The display 28 might display the words "Help Me", "Call 911" or other request for assistance when the theft alarm is triggered. Additionally, the operational software might include passcode protection to inhibit an unauthorized user from accessing the functional capabilities of the video camera 38 and the display 28. The transceiver 40 is synchronized with the operational software such that only the operational software can upload images and words into the transceiver 40.

An input port 44 is integrated into the housing 12 and the input port 44 can be electrically coupled to a data cable 46, such as a high definition multimedia interface cable, a universal serial bus cable or other commonly employed data cable for audio and video. The input port 44 is electrically to the control circuit 34 thereby facilitating data to be communicated to the control circuit 34 from the data cable 46. The data cable 46 might be coupled to a personal computer, for example, or other type of extrinsic electronic device that as data storage capabilities. An output port 48 is integrated into the housing 12 and the output port 48 can be electrically coupled to a data cable 49, such as a high definition multimedia interface cable, a universal serial bus cable or other commonly employed data cable for audio and video. The output port 48 is electrically coupled to the control circuit 34 thereby facilitating data to be communicated from to the output port 48 from the control circuit 34 wherein the output port 48 is configured to facilitate the data to be communicated to an extrinsic electronic device.

A power supply 50 is integrated into the housing 12 and the power supply 50 is electrically coupled to the control circuit 34. The power supply 50 comprises a battery 52 that is removably positioned in the housing 12 and the battery 52 is electrically coupled to the control circuit 34. A charge port 54 is integrated into the housing 12 and the charge port 54 is electrically coupled to the battery. Moreover, the charge port 54 can receive a charge cord 56 from a charger for charging the battery 52. The power supply 50 includes a power port 58 that is integrated into the housing 12 and the power port 58 is electrically coupled to the control circuit 34. The power port 54 receives a power cord 59 thereby facilitating the power port 54 to supply power to the control circuit 34 in lieu of the battery 52.

A sign 61 is provided that has a handle portion 62 and a panel portion 63, and the handle portion 62 can be gripped by a user 64 for displaying the panel portion 63. The housing 12 is attachable to the panel portion 63 of the sign 61 thereby facilitating the display 28 to visually communicate the message to the observer 31. The panel portion 63 has a first surface 66 and bottom edge 68, and the handle portion 62 extends downwardly from the bottom edge 68. The back wall 16 of the housing 12 is attachable to the first surface 66 of the panel portion 63 thereby facilitating the display 28 to be displayed. An adhesive strip may be present on the back wall 16 of the housing 12 to adhesively engage the first surface 66 of the panel portion 63, fasteners may be present on the back wall 16 of the housing 12 to engage the first surface 66, or the back wall 16 of the housing 12 may be integrated into the first surface 66 of the panel portion 63.

In use, the housing 12 is mounted at a desired location such that the housing 12 is visible to the observer 31. The customizable images or words are downloaded from the personal electronic device 42 to facilitate the display 28 to display the customizable images or words. In this way the display 28 can display any message that the user 64 wishes to convey. The message might be, for example, support of an athletic team, advertising of a retail event, issuing a statement of protest or any other idea the user 64 might wish to convey. Additionally, the housing 12 may be displayed on the panel portion 63 of the sign 61 to facilitate the display 28 to be displayed at an outdoor event, such as a support rally for a sports team, a political event or other event that would involve a large gathering of people.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A portable display assembly for displaying a customized message or image in any location, said assembly comprising:
   a housing being elongated;
   a display being coupled to said housing, said display extending along a substantial length of said housing, said display displaying indicia comprising customizable images and words wherein said display is configured to visually communicate a message to an observer;
   an adhesive strip being coupled to said housing wherein said adhesive strip is configured to engage a surface to retain said housing on the surface, said adhesive strip extending around said display such that said adhesive strip does not obstruct said display; and
   a sign having a handle portion and a panel portion wherein said handle portion is configured to be gripped by a user for displaying said panel portion, said housing being attachable to said panel portion of said sign wherein said display faces away from said panel such that said display is visible to be configured to visually communicate the message to the observer.

2. The assembly according to claim 1, wherein:
   said housing has a front wall, a back wall and an outer wall extending between said front wall and said back wall, said outer wall having a top side, a bottom side, a first lateral side and a second lateral side, said housing being elongated between said first lateral side and said second lateral side;
   said display being positioned on said front wall of said housing, said display being elongated to extend between said first lateral side and said second lateral side of said outer wall, said display receiving a downloaded signal comprising said customized images and words to be displayed on said display Wherein said display is configured visually communicate a variety of messages to the observer; and
   said adhesive strip is positioned on said front wall of said housing, said adhesive strip extending along each of said top side, said bottom side, said first lateral side and said second lateral side of said outer wall of said housing.

3. A portable display assembly for displaying a customized message or image in any location, said assembly comprising:
   a housing being elongated, said housing having a front wall, a back wall and an outer wall extending between said front wall and said back wall, said outer wall having a top side, a bottom side, a first lateral side and a second lateral side, said housing being elongated between said first lateral side and said second lateral side;
   a display being coupled to said housing, said display displaying indicia comprising customizable images and words wherein said display is configured to visually communicate a message to an observer, said display being positioned on said front wall of said housing, said display being elongated to extend between said first lateral side and said second lateral side of said outer wall, said display receiving a downloaded signal comprising said customized images and words to be displayed on said display wherein said display is configured visually communicate a variety of messages to the observer;
   an adhesive strip being coupled to said housing wherein said adhesive strip is configured to engage a surface to retain said housing on the surface, said adhesive strip extending around said display such that said adhesive strip does not obstruct said display, said adhesive strip being positioned on said front wall of said housing, said adhesive strip extending along each of said top side, said bottom side, said first lateral side and said second lateral side of said outer wall of said housing; and
   a sign having a handle portion and a panel portion wherein said handle portion is configured to be gripped by a user for displaying said panel portion, said housing being attachable to said panel portion of said sign wherein said display faces away from said panel such that said display is visible to be configured to visually communicate the message to the observer.

4. The assembly according to claim 3, further comprising:
   a control circuit being positioned in said housing, said control circuit being electrically coupled to said display, said control circuit including an electronic memory;
   a video camera being integrated into said housing wherein said video camera is configured to capture imagery of the area in which said housing is positioned, said video camera being electrically coupled to said control circuit, said video camera being positioned on said front wall of said housing, said video camera being integrated into said display;
   a transceiver being positioned in said housing, said transceiver being electrically coupled to said control circuit, said transceiver being in wireless communication with a personal electronic device, said transceiver receiving a downloaded signal comprising customized images and words from the personal electronic device thereby facilitating said customized images and words to be stored in said electronic memory for subsequently being displayed on said display;
   an input port being integrated into said housing wherein said input port is configured to be electrically coupled to a data cable, said input port being electrically to said control circuit thereby facilitating data to be communicated to said control circuit from the data cable; and
   an output port being integrated into said housing wherein said output port is configured to be electrically coupled to a data cable, said output port being electrically coupled to said control circuit thereby facilitating data to be communicated to said output port from said control circuit wherein said output port is configured to facilitate the data to be communicated to an extrinsic electronic device.

5. A portable display assembly for displaying a customized message or image in any location, said assembly comprising:

a housing being elongated, said housing having a front wall, a back wall and an outer wall extending between said front wall and said back wall, said outer wall having a top side, a bottom side, a first lateral side and a second lateral side, said housing being elongated between said first lateral side and said second lateral side;

a display being coupled to said housing, said display displaying indicia comprising customizable images and words wherein said display is configured to visually communicate a message to an observer, said display being positioned on said front wall of said housing, said display being elongated to extend between said first lateral side and said second lateral side of said outer wall, said display receiving a downloaded signal comprising said customized images and words to be displayed on said display wherein said display is configured visually communicate a variety of messages to the observer;

an adhesive strip being coupled to said housing wherein said adhesive strip is configured to engage a surface to retain said housing on the surface, said adhesive strip extending around said display such that said adhesive strip does not obstruct said display, said adhesive strip being positioned on said front wall of said housing, said adhesive strip extending along each of said top side, said bottom side, said first lateral side and said second lateral side of said outer wall of said housing;

a control circuit being positioned in said housing, said control circuit being electrically coupled to said display, said control circuit including an electronic memory;

a video camera being integrated into said housing wherein said video camera is configured to capture imagery of the area in which said housing is positioned, said video camera being electrically coupled to said control circuit, said video camera being positioned on said front wall of said housing, said video camera being integrated into said display;

a transceiver being positioned in said housing, said transceiver being electrically coupled to said control circuit, said transceiver being in wireless communication with a personal electronic device, said transceiver receiving said downloaded signal from the personal electronic device thereby facilitating said customized images and words to be stored in said electronic memory for subsequently being displayed on said display;

an input port being integrated into said housing wherein said input port is configured to be electrically coupled to a data cable, said input port being electrically to said control circuit thereby facilitating data to be communicated to said control circuit from the data cable;

an output port being integrated into said housing wherein said output port is configured to be electrically coupled to a data cable, said output port being electrically coupled to said control circuit thereby facilitating data to be communicated to said output port from said control circuit wherein said output port is configured to facilitate the data to be communicated to an extrinsic electronic device;

a power supply being integrated into said housing, said power supply being electrically coupled to said control circuit, said power supply comprising:

a battery being removably positioned in said housing, said battery being electrically coupled to said control circuit;

a charge port being integrated into said housing, said charge port being electrically coupled to said battery, said charge port receiving a charge cord from a charger for charging said battery; and a power port being integrated into said housing, said power port being electrically coupled to said control circuit, said power port receiving a power cord thereby facilitating said power port to supply power to said control circuit in lieu of said battery; and a sign having a handle portion and a panel portion wherein said handle portion is configured to be gripped by a user for displaying said panel portion, said housing being attachable to said panel portion of said sign wherein said display faces away from said panel such that said display is visible to be configured to visually communicate the message to the observer, said panel portion having a first surface and bottom edge, said handle extending downwardly from said bottom edge, said back wall of said housing being attachable to said first surface of said panel portion thereby facilitating said display to be displayed.

* * * * *